United States Patent [19]

Ris et al.

[11] Patent Number: 5,444,892
[45] Date of Patent: Aug. 29, 1995

[54] APPLIANCE FOR THE WET CLEANING OF FILTER CARTRIDGES IN FLUIDISED-BED APPARATUSES, SPRAY DRIERS AND MOVING-BED INTALLATIONS

[75] Inventors: Jürg Ris, Birsfelden; Hugo Eglin, Liestal; Mikael Bonde, Basel; Urs Frey, Muttenz, all of Switzerland; Francois Bubendorf, Ranspach-le-Bas, France

[73] Assignee: Niro-Aeromatic AG, Switzerland

[21] Appl. No.: 67,518

[22] Filed: May 25, 1993

[30] Foreign Application Priority Data

May 26, 1992 [CH] Switzerland .......................... 1698/92
Jan. 21, 1993 [CH] Switzerland .......................... 0176/93

[51] Int. Cl.⁶ ................................................. B08B 3/02
[52] U.S. Cl. ...................................... 15/304; 15/306.1; 134/152; 134/199; 210/409
[58] Field of Search ............... 15/304, 306.1; 134/199, 134/152, 146, 153, 86, 140, 148, 184

[56] References Cited

U.S. PATENT DOCUMENTS

| | | | |
|---|---|---|---|
| 2,756,455 | 7/1956 | Slaughte, Sr. | 134/153 |
| 3,174,490 | 3/1965 | Flarsheim | 134/153 |
| 3,604,437 | 9/1971 | Tappan, Jr. | 134/138 |
| 3,606,897 | 9/1971 | Tobin III et al. | 134/152 X |
| 3,608,567 | 9/1971 | Neill, Jr. | 134/138 |
| 3,620,234 | 11/1971 | Everroad | 134/86 |
| 3,958,296 | 5/1976 | Fell | 15/304 |
| 3,998,656 | 12/1976 | Grotto | 134/153 X |
| 4,299,245 | 11/1981 | Clapper | 134/152 X |
| 4,585,019 | 4/1986 | Jacobson | 134/152 X |
| 4,808,234 | 2/1989 | McKay et al. | 15/304 |
| 4,941,971 | 7/1990 | Albright | 210/107 |
| 5,059,331 | 10/1991 | Goyal | 210/748 |

FOREIGN PATENT DOCUMENTS

| | | |
|---|---|---|
| 1951105 | 5/1971 | Germany . |
| 2521828 | 11/1976 | Germany . |
| 3537138 | 4/1987 | Germany . |
| 1288375 | 9/1972 | United Kingdom . |

*Primary Examiner*—Frankie L. Stinson
*Attorney, Agent, or Firm*—Armstrong, Westerman, Hattori, McLeland, and Naughton

[57] ABSTRACT

The wet cleaning of filter cartridges (4) in fluidised-bed apparatuses and similar process units, without their being dismantled, is carried out by means of cleaning fluid sprayed out of nozzle orifices (10) arranged in the form of a ring, the nozzle orifices (10) being installed in the filtered exhaust-gas space (7) and the filter cartridge (4) being moved through this ring of nozzle orifices (10) by a lifting device (17). In a preceding flushing cycle, the filter cartridge (4) is filled with cleaning fluid and is then subjected to an ultrasonic transmitter (26) and with pressure pulses. The nozzle orifices (10) are designed and arranged in such a way that the issuing cleaning jets strike the filter casing (5) tangentially at an angle of inclination α and thus set the filter cartridge (4) in rotation. The best possible cleaning effect is achieved by the rotation and lift of the filter cartridge (4).

15 Claims, 3 Drawing Sheets

APPLIANCE FOR THE WET CLEANING OF FILTER CARTRIDGES IN FLUIDISED-BED APPARATUSES, SPRAY DRIERS AND MOVING-BED INTALLATIONS

The invention relates to an appliance for the washing of filters, particularly star-folded filter cartridges in fluidised-bed apparatuses and similar process units, such as spray driers and moving-bed installations.

The above units are nowadays in widespread use for drying, granulation and encapsulation in the pharmaceutical and food industries and for the production of washing agents and other chemical products. For the sake of simplified illustration, reference is made hereafter only to fluidised-bed apparatuses.

A fluidised-bed apparatus typically consists of the fluidising chamber and of an adjoining head part, in which a number of filters for separating the fluidisable material from the gas stream, usually air, are arranged. It has been customary to use fabrics or felts made of natural or synthetic fibres as filter material. An increasing layer of product dust is precipitated on the filter during the production process, thus leading to pressure losses and therefore to a decreasing separating capacity.

To free this precipitation from the filters, it is known, during continuous operation, to subject the filter to pressure pulses, preferably compressed-air surges, directed counter to the main gas stream. The precipitation is thereby blown off from the inside of the filter. In an effort to reduce the precipitation of product dust from the outset and, at the same time, increase the filtration fineness, a filter material, consisting of a supporting fleece together with the attached actual filter layer made of anti-adhesive polytetrafiuoroethylene, was developed. Even with the filter materials which are now more efficient, a more thorough cleaning, beyond the degree of cleaning obtainable by means of compressed-air pulses, has to be carried out repeatedly. Such a basic cleaning, including that of the filter, is necessary when the product generated in the fluidised-bed apparatus is changed, so as not to cause any contamination of the subsequent product. A thorough filter cleaning can likewise become necessary cyclically, depending on the duration of the production phase and on the type of product, when the filter material becomes clogged successively with the product dust over a relatively long period of operation, despite being blown free periodically.

Various washing processes and appliances have already been developed for such a kind of basic cleaning of gas-borne liquid-soluble particles from filters. Removing the filters from the fluidised-bed apparatus, washing the filters outside the installation and subsequently reinstalling them is unjustifiable in view of the high outlay in terms of assembly, the long standstill time of the apparatus and the possible danger to personnel from products involving a health risk.

German Offenlegungsschrift 3,316,527 discloses a washing appliance, where a flushing-fluid line having a plurality of spray nozzles can be moved within a cascade of filter hoses, in order to flush the filter surface free as completely as possible with the fluid jets. Two versions are proposed there. First, the spraying off of the exterior of the filter hoses, and second the introduction of the spray nozzles into the filter hoses with flushing from inside.

This appliance is unsuitable for the filter cartridges predominantly used in fluidised-bed apparatuses. When polytetrafiuoroethylene is used as a filter layer, a flushing operation from the inside of the cartridge outwards is unsuccessful because of its impermeability to fluids. A basic cleaning of large filter cartridges, especially with star-folded filter material, by external spraying by means of the construction described remains inadequate. Not all the surface portions of the filter cartridge are attacked directly by the flushing jets.

Depending on the specific use, not only the various fabrics, felts or nettings made of natural or synthetic fibres, composed of a layer of anti-adhesive polytetrafiuoroethylene attached to a supporting fleece, but also multi-layered steel nettings are employed as filter material. The structure and strength of the different filter materials necessitate and allow a differentiated washing treatment.

The process and appliance according to German Patent Specification 4,029,804 were developed for the thorough cleaning of filter cartridges in the installed state. In this version, the individual filter cartridge is surrounded at the head end, below the partition relative to the clean space of the fluidised-bed apparatus, with a ring line which has a ring of nozzle bores or a nozzle gap directed perpendicularly to the filter surface. The filter is sprayed with washing fluid via these orifices. The cleaning fluid running down the filter dissolves the layer of product dust adhering to it and flushes this off. During the flushing operation, the filter is subjected to compression-gas pulses which act outwards from inside the filter and which thus assist the breakaway of the particles located on the outer skin of the filter.

The satisfactory wet cleaning of star-folded filter is acknowledged, in the literature, as presenting problems. When there are extreme cleanliness requirements, as in pharmacy or food technology, the degree of cleaning achieved by the state of the art known hitherto is insufficient. There are two causes of this, both having an adverse effect. On the one hand, the more intensively cleaning jet of cleaning fluid strikes directly only a narrow band surface on the filter circumference with a corresponding jet pressure, whereas the much larger surface located downwards on the filter is in fact only flushed extensively free of the adhering product dust merely by the cleaning fluid flowing downwards. On the other hand, the washing nozzles themselves are located in the reaction space of the fluidised-bed apparatus. They are therefore contaminated by the product swirling round, are clogged partially or even completely and thus lose their operating capacity. This causes a standstill of the installation and an outlay in cleaning the nozzle orifices again.

The object of the invention is to provide a wet cleaning for the above-described purpose and, at the same time, eliminate the deficiencies occurring hitherto. That is to say, at as low an outlay as possible in terms of construction, to achieve a high degree of cleaning, even in respect of fluid-insoluble products, by a direct spraying of the entire filter surface clogged by particles with cleaning fluid and, at the same time, to protect the washing nozzles against contamination during continuous operation. In conjunction with this, the cleaning fluid used is to be utilised efficiently and a washing treatment satisfying the different requirements and prevailing conditions, also in terms of the various fluid-impermeable or fluid-permeable filter materials used, is to be provided.

The entire washing treatment is to be automated, in order to achieve a constantly high cleaning quality and largely eliminate changing human influences. The strict regulations regarding apparatus construction from pharmacy and the food industry are applicable as premises.

The necessary high degree of cleaning and the complete avoidance of the clogging of the washing nozzles were unattainable with the previous principle of construction of filter-washing appliances.

There had to be a completely new departure. An improved process for wet cleaning of filter cartridges and the appliance according to the present invention for carrying out that process and attaining the above stated object will now be described.

The wet-cleaning process provided by the invention and the associated appliance guarantee a high degree of cleaning, even where fluid-insoluble products are concerned, since all the regions of the active filter surface, even with star folding, are directly sprayed with cleaning fluid, and, with the fluidised-bed apparatus continuing to operate, the washing nozzles are no longer exposed to the product swirling round in the reaction space, with the result that they remain free of impurities. A washing treatment which conforms to the particular cleanliness requirements and is dependent on the "degree of contamination" and which is matched to the filter material used becomes possible. Even stubborn encrustations extending into the filter fabric are eliminated reliably, with cleaning fluid being used sparingly. The program-controlled execution of the washing treatment guarantees a uniformly high thoroughness, without the influence of subjective factors. The novel principle of construction meets internationally valid standards of apparatus construction, even in the most sensitive sectors.

It is proposed to install outside the reaction space, in the filtered exhaust-gas space, washing nozzles which are arranged in the form of a ring and surround the respective filter cartridge in cross-section and through which the cleaning fluid is conventionally sprayed onto the filter casing, and, by means of a sliding lifting movement, move the entire active filter surface through the jet range of the nozzle ring. In an extended washing programme, the filter cartridge is previously thoroughly flushed through with cleaning fluid and, in the filled state, subjected to ultrasound, if appropriate additionally with compressed air. The cleaning fluid can be drained off via a bottom valve in the filter cartridge. Such an extended washing programme consists of the flushing cycle, the prewash, the fine wash and the concluding aftertreatment.

For filter cartridges with filter materials of higher strength which withstand even harder jet pressure, the nozzle orifices are designed and arranged in such a way that the cleaning jets strike the filter casing tangentially at an angle $\alpha$ and thereby set the filter cartridge in rotation. The filter cartridge is moved through the ring of nozzle orifices by means of a lifting device. The rotation and simultaneous up-and-down stroke of the filter cartridge ensure the best jets striking the filter casing. Sealing between the head of the reaction space and the exhaust-gas space of the apparatus during the production phase takes place, through the filter cartridge suspended at its upper edge in this transition, by means of the intermediate lip gasket.

The invention is explained more closely in further detail in a preferred embodiment by means of the accompanying diagrammatic drawings. In these:

Figure 1:
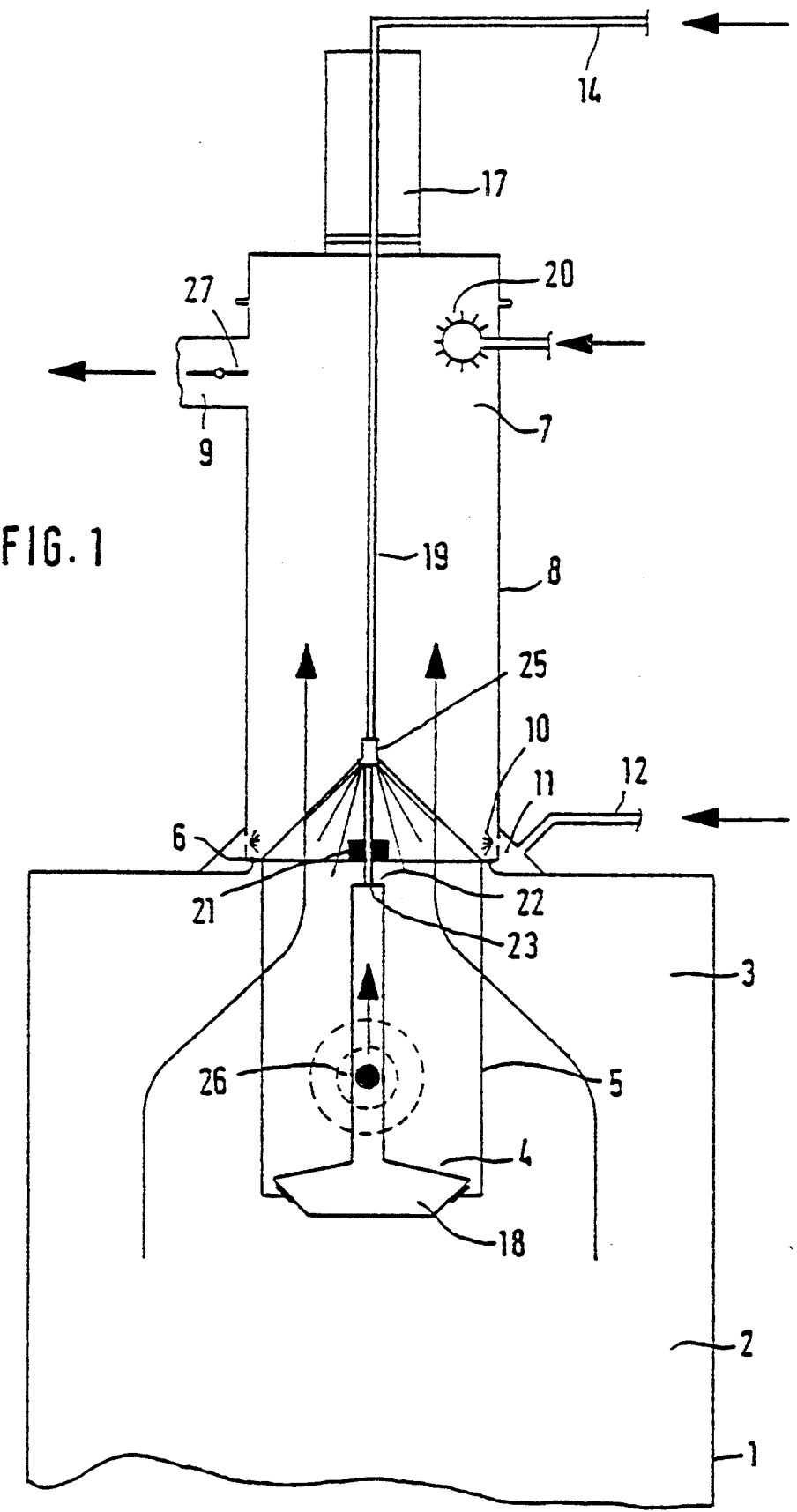
FIG. 1 shows the basic representation of the washing appliance.

The following description (FIG. 1) first refers only to one filter cartridge in the fluidised-bed apparatus; however, in actual fact, in the main a plurality of filter cartridges of this type are arranged in it. The part of the fluidised-bed apparatus, with the integrated washing appliance, which is relevant here consists of an apparatus housing 1, of the reaction space 2 with the reaction-space head 3 and of the filter cartridge 4 which is arranged therein and which the filter casing 5 surrounds axially. The filter cartridges 4 and filter casing 5 can have a different geometrical shape. Star folding is often employed on account of the enlarged active filter surface achieved thereby. For high stress, a steel filter fabric is preferred because of its greater strength.

Figure 2:
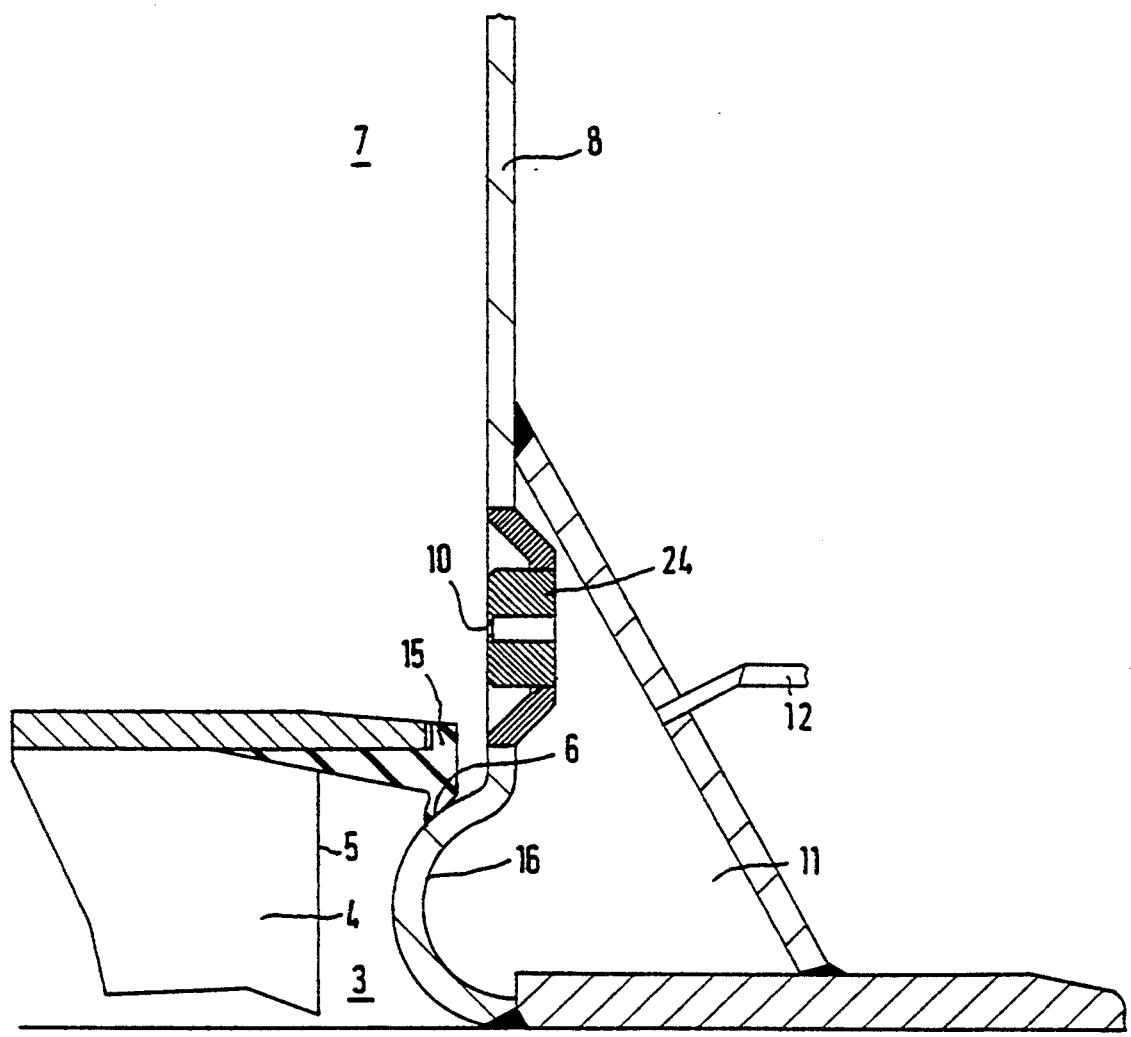
FIG. 2 shows the sealing point between the reaction space and exhaust gas side.
Figure 3:
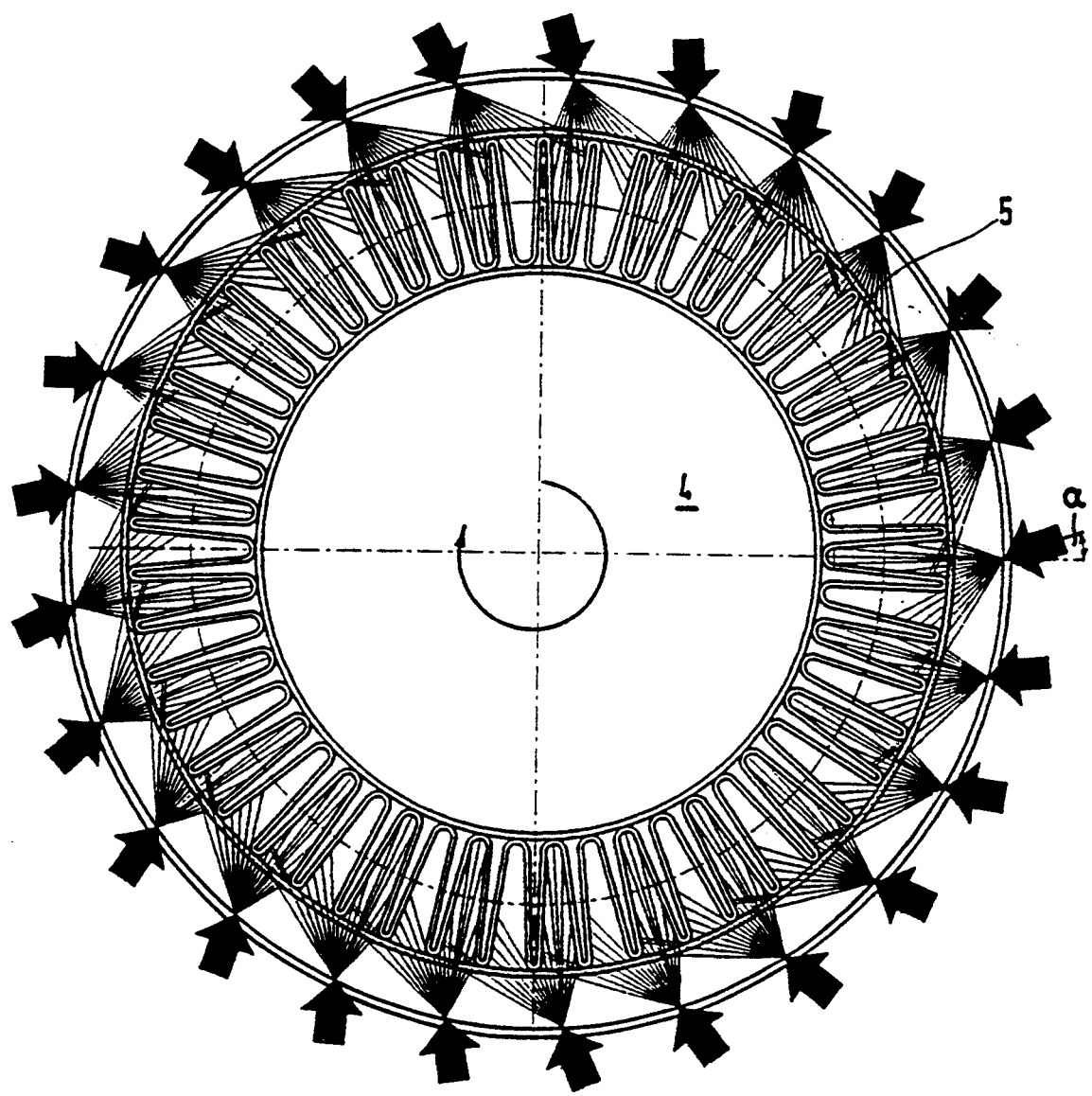
FIG. 3 shows the flow pattern from the ring of nozzle orifices.

The reaction-space head 3 and the exhaust-gas space 7 located above it are separated hermetically from one another by means of a sealing point 6 located in this transition. The exhaust-gas space is surrounded by the wall 8 which has the gas outlet 9. A shut-off flap 27 is arranged in the gas outlet 9. The sealing point 6 is formed (see FIG. 2) in that the filter cartridge 4 suspended at its upper edge in the abovementioned transition is surrounded by a lip gasket 15 which rests on a semicircle 16 as an extension of the wall 8. Located directly above the sealing point 6, and already directed into the exhaust-gas space 7 and arranged in the wall 8, is a ring of nozzle orifices 10 which is matched to the cross-sectional geometry of the filter cartridge 4 and which allows the filter cartridge 4 to move through this ring. The nozzle orifices 10 are the flow outlets of flat-jet nozzles 24 arranged in a symmetrical distribution. The nozzle orifices 10 are fashioned and arranged in such a way that the issuing jets of cleaning fluid are directed with a rotational effect onto the filter casing 5 tangentially at an angle of inclination $\alpha$ (see FIG. 3). The flat-jet nozzles 24 are supplied via an annular channel 11 and a feed line 12 as a distribution system for the cleaning fluid.

The nozzle orifices 10 can also be designed as a radial gap or consist of a plurality of centrically oriented bores. The jet of cleaning fluid issuing from them does not normally set the filter cartridge 4 in rotation. An arrangement of this type would be sufficient for the washing treatment of sensitive filter material, where work has to be carried out with a softer jet of cleaning fluid which, even as a jet striking tangentially, would not be sufficient to set the filter cartridge 4 in rotation.

On its bottom, the filter cartridge 4 has a filter-cartridge bottom valve 18 which is connected to a lifting device 17 via a linkage 19. The lead-through of the linkage 19 from the lifting device 17 into the filter cartridge 4 to the filter-cartridge bottom valve 18 takes place by means of a bush 21 seated on the top face of the filter cartridge 4. Underneath the bush 21, within the filter cartridge 4, the linkage 19 has a driving shoulder 22 which is designed at the same time as a mounting 23 for the rotational movement of the filter cartridge 4. The distance between the driving shoulder 22 and the bush 21 acting as a stop is governed by the maximum stroke of the filter-cartridge bottom valve 18. An ultrasonic transmitter 26, seated here on the linkage 19, is placed in operative proximity to the filter cartridge 4.

To subject the filter cartridge 4 to compressed gas by means of compressed-gas pulses, a delivery line 14 extends parallel to the linkage 19 and opens out in a compressed-gas outlet 25 located above the filter cartridge 4. In the head of the exhaust-gas space 7 is provided a flushing nozzle 20 for the purpose of the flushing of the exhaust-gas space 7, the rapid filling of the filter cartridge 4 with cleaning fluid and the complete flushing of the fluidised-bed apparatus.

The description of the operating cycle follows. In this, the washing programme explained constitutes a maximum version for especially high cleanliness requirements and heavily loaded filter cartridges 4. Under simpler conditions, a reduced washing programme is also sufficient according to the circumstances. In the production phase (see FIG. 1 ), in which fluidisable material is treated, the filter cartridge 4 is in its lowest position and, at the same time, is pressed against the sealing point 6 (the state according to FIG. 2). Cleaning fluid is not introduced either via the flushing nozzle 20 or via the nozzle orifices 10; the filter cartridge 4 is not subjected to compressed-gas pulses, the ultrasonic transmitter 26 is inactive and the filter-cartridge bottom valve 18 is closed. The shut-off flap 27 in the gas outlet 9 is open.

The gas stream flowing into the head of the reaction space 3 passes through the filter casing 5 and leaves the filter cartridge 4 in the direction of the exhaust-gas space 7 to the gas outlet 9. When it passes through the filter casing 5, the product is separated, but successively clogs the latter. The filter casing 5 is roughly blown free from inside the filter cartridge 4 periodically or in dependent on a measured differential-pressure signal by means of compressed-gas pulses via the delivery line 14 and the compressed-gas outlet 25.

Because the nozzle orifices 10 are arranged completely outside the reaction space 2 so as to be partitioned off by the sealing point 6, the nozzle orifices 10 remain free of any traces of the product. In particular, the risk that nozzle orifices 10 will possibly be blocked is eliminated.

If a basic cleaning of the filter cartridge 4 becomes necessary because of a product change or as a result of a progressive encrustation of the filter casing 5, this no longer being dissolvable by compressed-gas pulses, there is a change-over to the washing cycle.

The gas/product stream flowing in the direction of the reaction-space head 3 is interrupted and the product is emptied from the fluidised-bed apparatus. A flushing cycle is carried out before the first actual washing phase. For this purpose, cleaning fluid, for example normal mains water, is introduced via the flushing nozzle 20 and/or via the nozzle orifices 10, the filter-cartridge bottom valve 18 remaining in the zero position, that is to say closed, and the filter cartridge 4 continuing to be in its lowest position seated in the sealing point 6 (see FIG. 2). The cleaning fluid runs into the filter cartridge 4 from above and thoroughly flushes the filter casing 5 from the inside. If the inflow of cleaning fluid is set high, the filter cartridge 4 fills, since the flow-off through the fine-mesh filter casing 5 does not take place to the same degree. When the desired filling level is reached, the ultrasonic transmitter 26 is activated. The stubborn encrustations on the filter casing 5 which may be drawn into the filter fabric are dissolved by means of ultrasound. As early as while subjection to ultrasound is taking place and/or immediately thereafter, the shut-off flap 27 in the gas outlet 9 is closed and an adjustable gas pressure is applied via the delivery line 14 and the compressed-gas outlet 25 to the filter cartridge 4, that is to say to the cleaning fluid now located in it. An intensified flushing effect through the filter casing 5 from inside the filter cartridge 4 outwards can thus be achieved. The product-laden cleaning fluid can leave the fluidised-bed apparatus via an outlet (not shown). The filter fabric must have a specific minimum strength according to the stresses caused by the ultrasonic treatment; steel filter fabrics are preferably employed.

The flushing cycle now changes to the prewashing phase. The ultrasonic transmitter 26, which, if appropriate, has been activated up to now, is switched off. Subjection to compressed-gas pulses can be continued as required. The lifting device 17 which was under prestress in the downward direction is now actuated in the upward direction. This prestress via the linkage 19 caused the filter-cartridge bottom valve 18 to be pressed against the seat of the filter cartridge 4 and, at the same time, by means of the downward pull acting on the latter, caused the lip gasket 15 to be pressed onto the semi-circle 16, with the result that the sealing point 6 remained reliably closed. The linkage 19 moves successively upwards, and the filter-cartridge bottom valve 18 is raised and frees the seat. The residual cleaning fluid still remaining in the filter cartridge 4 from the flushing cycle can thus run out. The linkage 19 moves further upwards; the driving shoulder 22 butts against the bush 21, with the result that the filter cartridge 4 is now moved continuously upwards through the ring of nozzle orifices 10 into an end position. This upper end position is selected so that even the lowest edge zone of the filter casing 5 is covered by the cleaning jets from the nozzle orifices 10. While the filter cartridge 4 is being raised, the fiat-jet nozzles 24 are subjected to cleaning fluid via the feed line 12 and the annular channel 11. As a result of the angle of inclination α at which the nozzle orifices 10 are directed towards the filter casing 5, the issuing cleaning jets strike the filter casing 5 tangentially and set the filter cartridge 4, suspended rotatably on a mounting 23, in rotation, the mounting 23 being located on the linkage 19 in the region of the driving shoulder 22. The filter cartridge 4 now simultaneously executes an upward lifting movement and a rotational movement. All the zones of the filter casing 5 are thereby sprayed intensively and efficiently with cleaning fluid. When the upper end position is reached, the lifting movement of the filter cartridge 4 is reversed, so that the washing operation is continued in the downward stroke. However, other parts of the fluidised-bed apparatus could also expediently be washed before the downward stroke on account of the opened position, the sealing point 6 and the seat of the filter-cartridge bottom valve 18 being open. After the downward stroke, the prewash is terminated and the predominant part of the product particles is washed out.

The flushing cycle and prewashing phase are followed by the fine-washing phase. Since now only an extremely small fraction of product particles still remaining has to be washed out, during the fine-washing phase the cleaning fluid can be used repeatedly in closed circuit. The fine-washing phase can be initiated by a renewed flooding of the filter cartridge 4 which is in its lowest position, that is to say the sealing point 6 and the filter cartridge bottom valve 18 are closed. The process corresponds to the above-described flushing cycle, including the possible additional subjection to ultrasound and compressed-gas pulses. The filter cartridge 4 and the interior of the apparatus are thereby thoroughly flushed out once again. After the possible flooding, the lifting device 17 is switched on again, in order to move the entire filter casing 5 in the course of a plurality of up-and-down strokes through the ring of cleaning jets spraying out of the nozzle orifices 10. The duration of this treatment phase depends on the degree of cleanliness required.

For particularly stringent cleanliness requirements, the fine-washing phase can be followed by an aftertreatment. For this purpose, a renewed flushing cycle and a subsequent fine-washing phase with demineralised water are carried out. Finally, a blowing out of the nozzle orifices 10 and of the flushing nozzle 20 by means of compressed air takes place. Lastly, before a new production phase commences, the interior of the apparatus is thoroughly dried, for example with hot air.

Before the start of the next production phase, the filter cartridge 4 must be in its initial position, namely the lowest position. The filter-cartridge bottom valve 18, again in the zero position, is closed and is subjected to a pressure force by the lifting device 17 via the linkage 19 for reliable sealing, with the result that the sealing point 6 is also sealed off hermetically. The flushing nozzle 20, the nozzle orifices 10 and the ultrasonic transmitter 26 are inactive. The shut-off flap 27 is open, whereas the outlet (not shown) for the cleaning fluid in the fluidised-bed apparatus is closed.

As a rule, a plurality of filter cartridges 4 are accommodated in a fluidised-bed apparatus; the operating systems of the washing appliance are then present in a corresponding number and the cleaning cycles are co-ordinated on all the filter cartridges 4, for example in such a way that the cleaning cycle on any two filter cartridges 4 proceeds simultaneously and, after the end of the cycle, is changed over to the next pair of filter cartridges 4.

We claim:

1. Appliance for wet cleaning adhering particles from filter cartridges (4) in process units of the type including fluidised-bed apparatuses, spray driers, moving-bed installations and combinations of such units, by treatment with cleaning fluid which is introduced by a ring of nozzle orifices (10) within the process unit and matched to the cross-sectional geometry of the filter cartridges (4) and fed via a delivery, comprising adjusting members for controlling all material streams, characterized in that the nozzle orifices (10) positioned in the form of a ring are directed towards a filter casing (5) at an angle of inclination α and are arranged in an exhaust-gas space (7), which a sealing point (6) seals off hermetically from a head of a reaction space (3), and a lifting device (17) for executing up-and-down movement of the filter cartridge (4) and an actuable filter-cartridge bottom outlet (18), said filter cartridge (4) being suspended on a linkage (19) of the lifting device (17).

2. Appliance according to claim 1, characterized in that an ultrasonic transmitter (26) is located within or at the filter cartridge (4) or in operative proximity of the filter cartridge (4).

3. Appliance according to claim 1, characterized in that a flushing nozzle (20) for flushing the exhaust-gas space (7) or for rapidly filling the filter cartridge (4) with cleaning fluid is arranged in a head of the exhaust-gas space (7).

4. Appliance according to claim 1, characterized in that the ring of nozzle orifices (10) is formed from a plurality of radially arranged flat-jet nozzles (24).

5. Appliance according to claim 1, characterized in that the sealing point (6) is formed in a transition from the head of the reaction space (3) the exhaust-gas space (7) by means of the filter cartridge (4) suspended at its upper edge and of an intermediate lip gasket (15).

6. Appliance according to claim 5, characterized in that a pressure force acting downwards on the filter-cartridge bottom outlet (18) is exerted by means of the lifting device (17) via the linkage (19), in order to achieve a reliably closing pressing of the filter-cartridge bottom outlet (18) against a seat in the filter cartridge (4) and of the lip gasket (15) on a semicircle (16) in the sealing point (6) during a production phase and during a flushing cycle.

7. Appliance according to claim 1, characterized in that the up-and-down movement of the filter cartridge (4), executed by the lifting device (17), is coupled with the actuation—opening and closing—of a filter cartridge bottom valve (18), which constitutes said filter-cartridge outlet (18).

8. Appliance according to claim 1, characterized in that the linkage (19) passes through a bush (21) seated on the filter cartridge (4) and a driving shoulder (22) thickening the linkage (19) is provided on the linkage (19), underneath the bush (21), with the result that, during the upward stroke of the linkage (19), first the filter-cartridge bottom outlet (18) is opened and, then from the butting of the driving shoulder (22) against the bush (21), the filter cartridge (4) is raised.

9. Appliance according to claim 1, characterized in the filter cartridge (4) being suspended rotatably, on the linkage (19) of the lifting device (17).

10. Appliance according to claim 9, wherein said filter cartridge is suspended rotatably by means of a mounting (23) on said linkage (19).

11. Appliance according to claim 1, characterized in that means are provided for loading said exhaust-gas space with compressed gas and the exhaust-gas space (7) has a gas outlet (9) with a shut-off valve (27) for closing said gas outlet when said exhaust-gas space (7) is loaded with compressed gas.

12. Appliance for wet cleaning adhering particles from filter cartridges (4) in process units of the type including fluidised-bed apparatuses, spray driers, moving-bed installations and combinations of such units, by treatment with cleaning fluid which is introduced by a ring of nozzle orifices (10) within the process unit and matched to the cross-sectional geometry of the filter cartridges (4) and fed via a delivery, comprising adjusting members for controlling all material streams, characterized in that the nozzle orifices (10) positioned in the form of a ring are directed centrally towards a filter casing (5) and are arranged in an exhaust-gas space (7), which is sealed off hermetically from a head of a reaction space (3) by a sealing point (6), a lifting device (17) for executing up-and-down movement of the filter cartridge (4) and an actuable filter-cartridge bottom outlet (18), said filter cartridge (4) being suspended on a linkage (19) of the lifting device (17).

13. Appliance according to claim 12 wherein said nozzle orifices (10) are formed as a radially extending nozzle gap.

14. Appliance according to claim 12 wherein said nozzle orifices (10) are formed as a ring of passage bores.

15. Appliance according to any one of claims 1 to 9, 11, 6 or 12, characterized in that, in a process unit having a plurality of filter cartridges (4), the wet-cleaning appliance is present in a corresponding number.

* * * * *